Dec. 26, 1967  W. A. HENSLEY, JR  3,360,773
ACOUSTICAL SIGNAL DETECTING
Filed Aug. 29, 1966
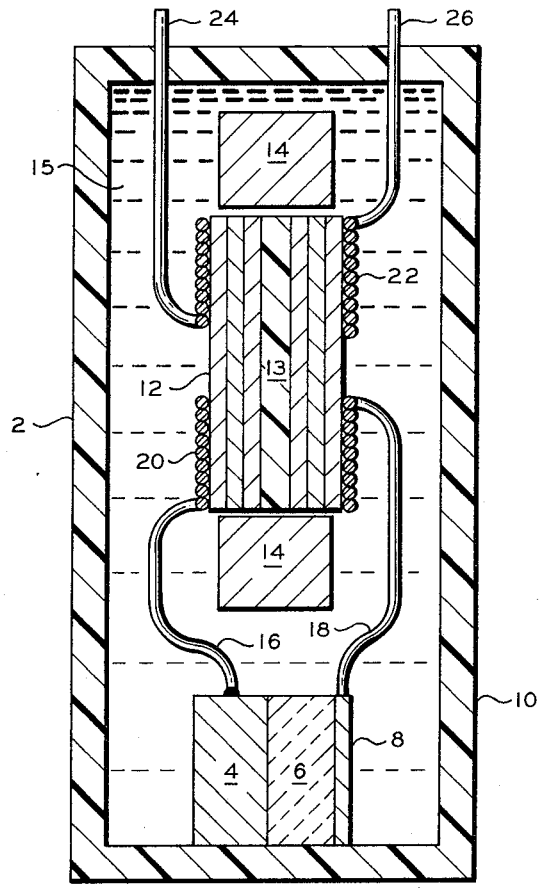
INVENTOR
W. A. HENSLEY, JR.
BY Young & Quigg
ATTORNEYS 3,360,773
ACOUSTICAL SIGNAL DETECTING
William A. Hensley, Jr., Bartlesville, Okla., assignor to Phillips Petroleum Company, a corporation of Delaware
Filed Aug. 29, 1966, Ser. No. 575,877
8 Claims. (Cl. 340—17)

ABSTRACT OF THE DISCLOSURE

In an acoustical seismometer the primary and secondary windings of a transformer are wound about a magnetostrictive element, a piezoelectric crystal is connected across the leads of said primary winding, and both the magnetostrictive element and the piezoelectric crystal are positioned to be subjected to pressure signals incident upon the exterior of the seismometer. Permanent magnets can be positioned adjacent the magnetostrictive element to maintain a strong magnetic field therethrough.

This invention relates to acoustical signal detecting. In one of its aspects it relates to an acoustical signal detector in which a piezoelectric device is used in connection with a magnetostrictive device to sense acoustical signals and produce an electrical signal representative of the sensed acoustical signal.

A knowledge of velocity of propagation of acoustical waves in earth formations is valuable in analyzing oil producing regions penetrated by wells and in making seismic surveys. These velocities can be measured by lowering an acoustical signal generator and one or more detectors into a well to make measurements at various depths. Signal detectors must be able to pick up weak as well as strong signals due to pressure in order to some extent to filter out background noises and to produce an electrical signal proportional to the acoustical signal so detected.

One type of seismic detector employs a piezoelectric element which is coupled with an electric circuit. Changes in the pressure on the piezoelectric element due to acoustical signals cause a current to be induced in the circuit. The current in this circuit can be reflected across a transformer to match the impedance of a measuring or amplifier circuit.

I have now discovered that an improved acoustical signal can be detected by employing a magnetostrictive element electrically coupled to a piezoelectric element.

By various aspects of this invention, one or more of the following, or other, objects can be obtained.

It is an object of this invention to provide a novel seisomometer.

It is a further object of this invention to provide a method and apparatus for sensing acoustical signals.

It is a further object of this invention to provide a seismometer with improved sensibility.

A still further object of this invention is to provide a sensitive seismometer with an efficient electrical circuit.

Other aspects, objects, and the several advantages of this invention are apparent to one skilled in the art from a study of this disclosure, the drawing, and the appended claims.

According to the invention, there is provided a seismometer having a piezoelectric device coupled with a magnetostrictive sensing device. The combined output from the two elements can be stepped down by a transformer and the signal output from the transformer used in a recording circuit.

In one embodiment, and preferably, the magnetostrictive device forms the core of the step down transformer.

The invention will now be described with reference to the accompanying drawing which schematically shows an embodiment of the invention.

Referring now to the drawing, a casing 2 made of suitable non-hygroscopic thermoplastic material or rubber such as neoprene encases the sensing elements composed of piezoelectric crystal 6 and magnetostrictive element 12. The casing material can be any suitable material which will transmit sound waves from the outside surface 10 into the interior thereof. Piezoelectric crystal 6 can be any suitable transducer crystal such as barium titanate or lead zirconium titanate. The magnetostrictive element 12 can be any suitable magnetic material which exhibits magnetostrictive properties. A suitable material is iron and iron vanadium alloys. The magnetostrictive device 12 is preferably made of three concentric tubular layers of magnetostrictive material placed concentrically about a wooden or plastic core 13. Piezoelectric crystal 6 is backed by a rigid metal plate 4 and has coated on the other side thereof a flexible pressure metallic coating 8. Plate 4 is connected to lead 16 and coating 8 is connected to lead 18, both of which leads are connected to coil 20 which is wrapped around magnetostrictive element 12. Magnetostrictive element 12 has permanent magnets 14 at either end thereof. A horseshoe magnet could also be used to maintain a strong magnetic field through element 12. The permanent magnets 14 serve to maintain the magnetism within magnetostrictive element 12 substantially constant. A secondary coil 22 is wrapped around magnetostrictive element 12. Leads 24 and 26 carry a current from secondary coil 22 to a suitable recording device which can have an amplifier to amplify in the current. Coil 20 forms a primary coil of a transformer which steps down the voltage and matches the impedance with the measuring circuit. The secondary coil of the transformer is coil 22. As is understood by one skilled in the art, coils 20 and 22 can be wound together. However, for purposes of illustration they have been shown as wound separately. A constant viscosity liquid 15 is placed within the casing to transmit the pressure signals from the casing 2 to the sensing devices.

In operation, a seismic signal creates a pressure against side 10 of the detector. This pressure signal is transmitted through the covering material to piezoelectric crystal 6 which produces current in leads 16 and 18 and coil 20. Simultaneously, the pressure signal is transmitted to magnetostrictive element 12 which due to change in shape will induce a current in coils 20 and 22. The current in coil 20 is induced into coil 22 and a signal representative of the acoustical signal is passed through lines 24 and 26 to a suitable recording device.

The windings of the transformer should be such that the transformer is "hum-bucking."

Preferably, the magnetostrictive element 12 will be a metal tube which can be made from wrapping an oriented iron vanadium alloy strip into a cylindrical shape. Another suitable magnetostrictive element could comprise a round iron pipe shaped rod with a wooden core.

In operation, the circuit containing the primary coil will have an impendance of about 10,000 ohms. The circuit containing the secondary coil will have an impedance of about 500 ohms. Thus, it is preferable to have a stepped down ratio of 10:1 (primary to secondary) in the transformer.

As is understood by one skilled in the art, in the circuit containing the primary coil, the crystal 6 will be a capacitance and the magnetostrictive element 12 will be an inductance. Thus, it is possible by choice of design of the magnetostrictive element and the piezoelectric element to have a frequency tunable circuit. In this manner, certain noises such as background noises can be eliminated. The circuit could be tuned for a resonance of 30 c.p.s. by providing a 0.5 mfd. capacitance for the piezoelectric device and a 50 henry inductance for the magnetostrictive device.

Reasonable variation and modification are possible within the scope of the foregoing disclosure, the drawing, and the claims to the invention without departing from the spirit thereof.

I claim:
1. A seismometer comprising:
   (a) a piezoelectric sensing device having first and second electrical leads connected thereto, said piezoelectric sensing device being positioned in said seismometer so as to be subjected to pressure signals incident upon the exterior of said seismometer and to produce electrical signals in said first and second electrical leads responsive to such incident pressure signals;
   (b) a magnetostrictive sensing means positioned in said seismometer so as to be subjected to said pressure signals incident upon the exterior of said seismometer and to produce a variable magnetic field responsive to said incident pressure signals;
   (c) a transformer having a primary winding and a secondary winding, said primary winding and said secondary winding being wound about said magnetostrictive sensing means so that said variable magnetic field produced by said magnetostrictive sensing means responsive to said incident pressure signals will induce an electric current in each of said primary winding and said secondary winding, third and fourth electrical leads connected to the opposite ends of said secondary winding; said first and second electrical leads being connected to the opposite ends of said primary winding to cause said electrical signals produced by said piezoelectric sensing device to pass through said primary winding and induce corresponding electrical signals in said secondary winding, the output of said seismometer being the composite electrical signals appearing between said third and fourth electrical leads resulting from said electrical signals produced by said piezoelectric sensing device and from the electric current induced in said primary and secondary windings by said magnetostrictive sensing means responsive to said incident pressure signals.

2. A seismometer in accordance with claim 1 wherein said transformer is a step down transformer.

3. A seismometer in accordance with claim 2 further comprising permanent magnet means to maintain a magnetic field through said magnetostrictive sensing means.

4. A seismometer in accordance with claim 1 wherein said piezoelectric sensing device comprises a piezoelectric crystal backed by a rigid metal plate on one side and having a flexible metallic coating on the opposite side, said first electrical lead being connected to said rigid metal plate, and said second electrical lead being connected to said flexible metallic coating.

5. A seismometer in accordance with claim 4 wherein said magnetostrictive sensing means comprises three concentric tubular layers of magnetostrictive material placed concentrically about a core of non-magnetostrictive material.

6. A seismometer in accordance with claim 5 further comprising first and second permanent magnets located at opposite ends of said tubular layers to maintain a strong magnetic field through said magnetostrictive sensing means.

7. A seismometer in accordance with claim 6 wherein the capacitance of said piezoelectric sensing device and the inductance of said magnetostrictive sensing means produce a tuned circuit to eliminate background noise.

8. A seismometer in accordance with claim 7 wherein said capacitance is approximately 0.5 mfd. and said inductance is approximately 50 henries, said primary coil has an impedance of about 10,000 ohms and said secondary coil has an impedance of about 500 ohms, and said transformer is a step down transformer having a primary to secondary ratio of approximately 10:1.

References Cited

UNITED STATES PATENTS

| 2,834,421 | 5/1958 | Summer | 340—11 X |
| 2,834,943 | 5/1958 | Grisdale et al. | 332—51 |

BENJAMIN A. BORCHELT, *Primary Examiner.*

P. A. SHANLEY, *Assistant Examiner.*